United States Patent [19]
Becker

[11] 3,751,923
[45] Aug. 14, 1973

[54] VALVE CONTROLLED HYDRAULIC COUPLING

[75] Inventor: John E. Becker, Bowmanville, Ontario, Canada

[73] Assignee: Eclipse Consultants Limited, Oshawa, Ontario, Canada

[22] Filed: Feb. 11, 1972

[21] Appl. No.: 225,514

[52] U.S. Cl. .................................................. 60/359
[51] Int. Cl. ............................................ F16h 41/20
[58] Field of Search ....................... 60/54, 359, 357, 60/347

[56] References Cited
UNITED STATES PATENTS
3,165,894  1/1965  Nelden .................................... 60/54
3,402,554  9/1968  Thomson et al. ...................... 60/54

Primary Examiner—Edgar W. Geoghegan
Attorney—Stanley J. Rogers

[57] ABSTRACT

A hydraulic coupling is provided with a reservoir compartment connected to the working compartment via a valve controlled by the operator in order to control the torque transmission capacity of the coupling. This valve comprises a spoked dished member which is mounted for movement along the coupling axis and is movable by the operator's control to open valve orifices disposed at the end of the spokes and thereby permit the working liquid to flow by centrifugal action from the working compartment into the reservoir compartment. Working liquid in the reservoir compartment is returned to the working compartment by a scoop tube including a valve device that is closed as the first mentioned valve is opened. The coupling may also include another reservoir chamber into which working fluid empties automatically upon existence of a stall condition. A vent may be provided from the exterior of the coupling to a portion of working circuit where there is no circulation of fluid, thereby avoiding any pressure build up under stall conditions in the interior of the coupling, and permitting lighter construction for the coupling.

15 Claims, 4 Drawing Figures

Patented Aug. 14, 1973 3,751,923

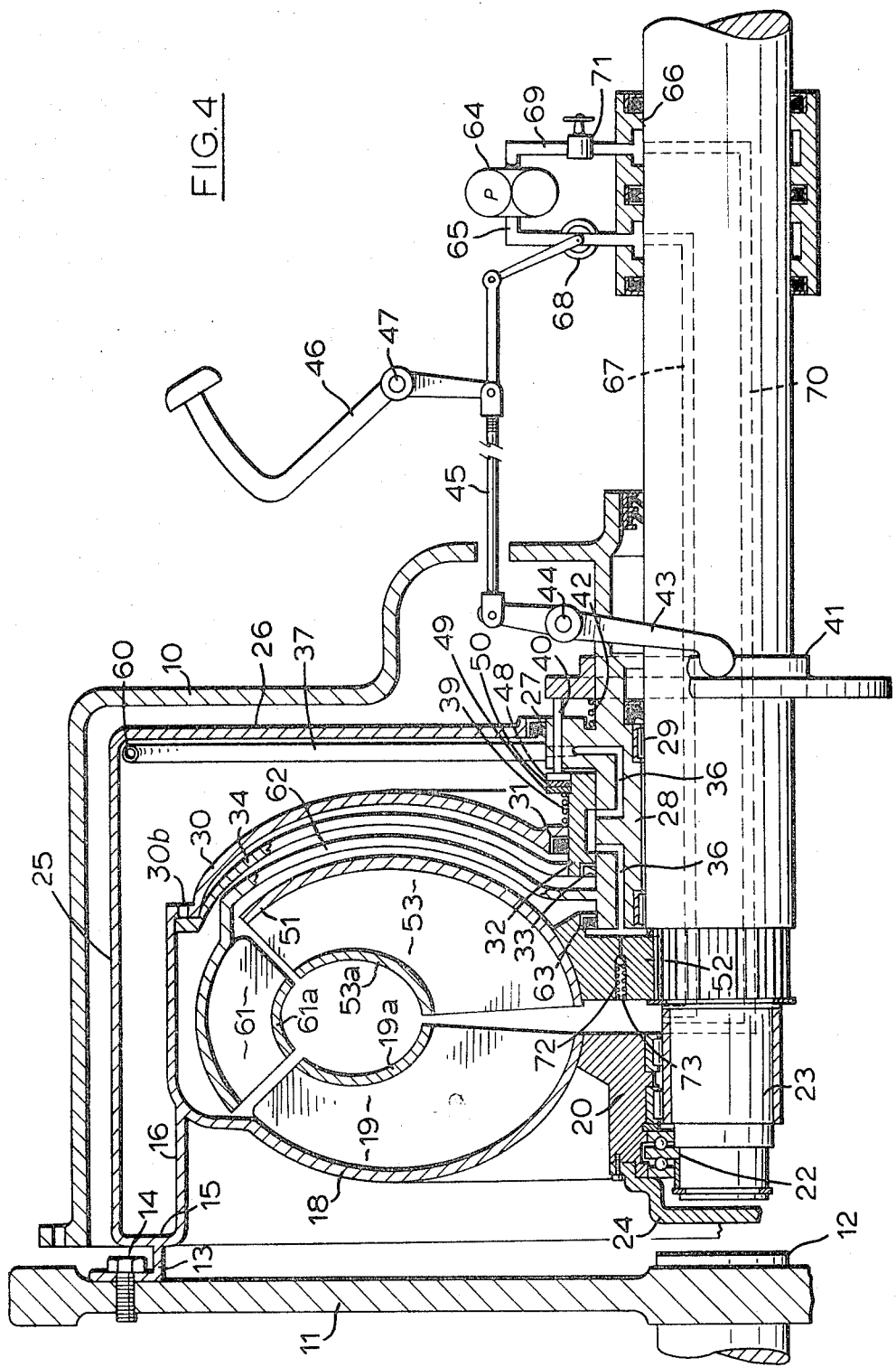

3,751,923

VALVE CONTROLLED HYDRAULIC COUPLING

FIELD OF THE INVENTION

This invention is concerned with improvements in or relating to hydraulic couplings of the kind comprising a pump element and a turbine element (sometimes known respectively as the impeller and runner elements) each provided with a plurality of radially-extending, vortex-producing vanes. The interiors of the elements together form a toroidal working chamber containing a quantity of working liquid, usually an oil, and the two elements are coupled together for the transmission of torque between them by liquid vortices that are established in the working chamber between the said vanes.

The invention is concerned especially with such couplings in which means are provided for varying the degree of filling of the working chamber to vary the torque and power transmission capacity of the coupling.

REVIEW OF PRIOR ART

Hydraulic couplings are commonly employed in power transmission systems between a prime mover, such as an internal combustion engine or an electric motor, and a load to be driven by the prime mover, such as a vehicle. In an ideal arrangement the torque transmitted by the coupling is negligible while the prime mover is operating at idling speeds, and increases smoothly and progressively to a maximum when the prime mover reaches its designed optimum speed range.

There is disclosed and claimed in my Canadian Pat. Ser. No.: 896,311, issued Mar. 28, 1972, a hydraulic coupling provided with a reservoir rotatable with the pump element and a plurality of passages leading from the working chamber to the reservoir, some of these passages feeding the working liquid into the reservoir automatically upon the existence of a stall or overload that slows the turbine element, while other of the passages return the liquid from the reservoir to the working chamber under centrifugal action, the flow rates into and out of the reservoir being arranged for the coupling to transmit temporarily more than the usual torque overload before setting to a lower steady overload value.

DEFINITION OF THE INVENTION

It is the principal object of the present invention to provide a new hydraulic coupling of the type wherein the torque and power transmission capacity can be controlled.

It is a more specific object to provide a new hydraulic coupling with valve means controlling the filling of the working chamber of the coupling, thereby controlling the torque and power transmission capacity of the coupling.

In accordance with the present invention there is provided a new hydraulic coupling comprising radially-vaned pump and turbine elements together defining a toroidal working chamber, a reservoir chamber rotatable with the pump element, flow passages at a radially-outer part of the working chamber to permit when open flow of working liquid from the working chamber to the reservoir chamber, first valve means comprising an annular valve member movable with the pump member and mounted for axial movement relative to the pump member to open and close the said flow passages, and pick-up means operative between the reservoir chamber and the working chamber to return liquid to the working chamber, the pick-up means including second valve means operable with operation of the first valve means to at least reduce such return of working liquid to the working chamber and thereby reduce the torque and power transmission capacity of the coupling.

Also in accordance with the present invention there is provided a new hydraulic coupling comprising radially vaned pump and turbine elements rotatable about a common axis and together defining a toroidal working chamber, a radially outwardly extending vent passage carried by one of the elements and having an inlet disposed in the location in the working chamber of minimum liquid circulation for normal liquid vortices established therein, and having an outlet closer to the coupling axis than the said inlet, and a centrifugally openable valve in the vent passage opening upon rotation of the element at more than a predetermined minimum speed.

Preferably the said vent passage is provided by a radially outwardly extending tube extending from a hub of the respective element, and a radially outwardly extending bore in the said hub extending from the radially inmost end of the said tube and including the said valve.

DESCRIPTION OF THE DRAWINGS

A hydraulic coupling and a hydraulic coupling torque converter which are particular preferred embodiments of the invention will now be described, by way of example, with reference to the accompanying diagrammatic drawings, wherein;

FIG. 4 is a cross section, similar to FIG. 1, through the hydraulic coupling torque converter, which is of pressurised type.

Similar parts are given the same reference in all the figures of the drawing.

DESCRIPTION OF THE PREFERRED EMBODIMENTS

Figure 1:
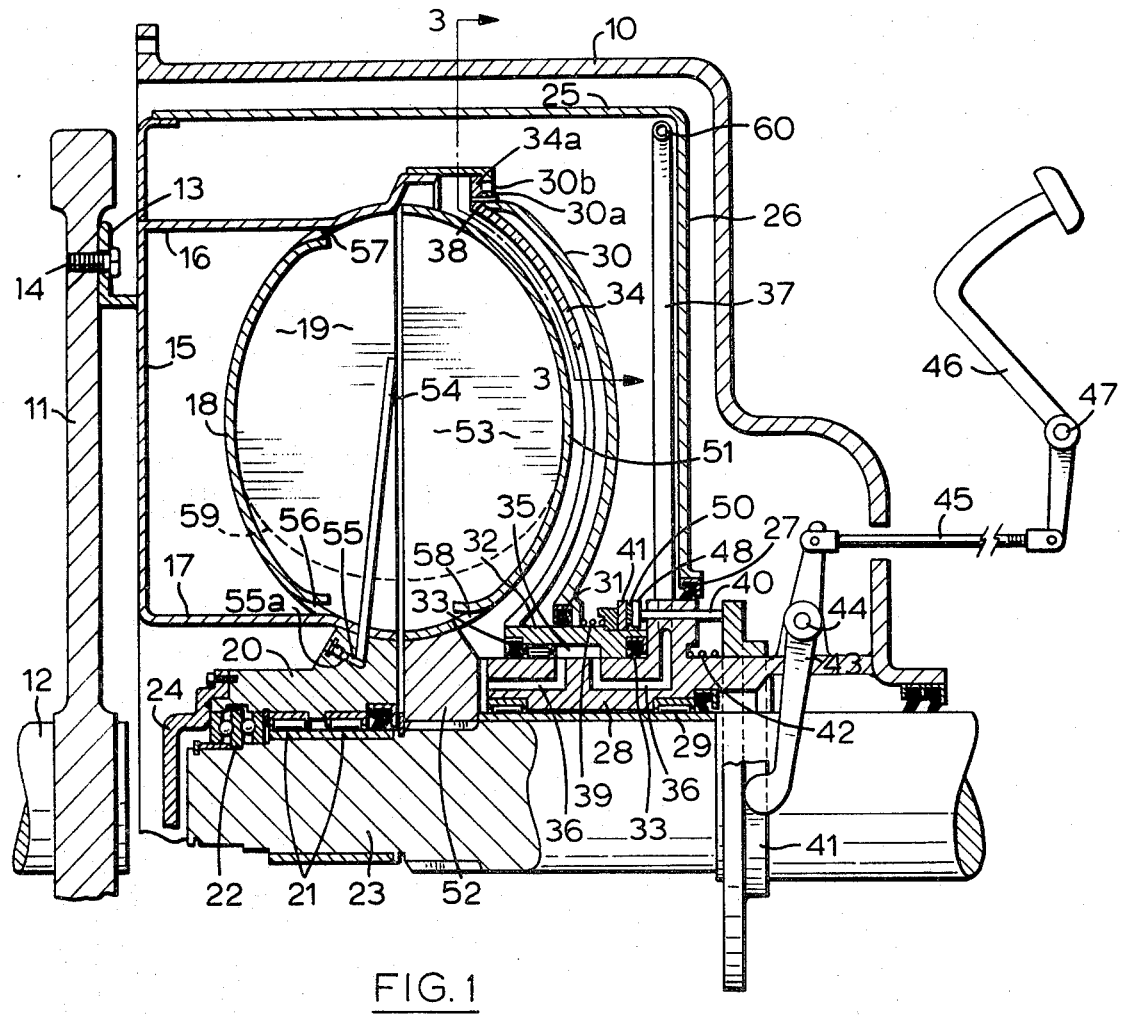
FIG. 1 is a cross section through the upper portion only of the hydraulic coupling, taken on the longitudinal axis thereof, and showing the first valve means thereof in closed position and the second valve means in open position.
Figure 3:
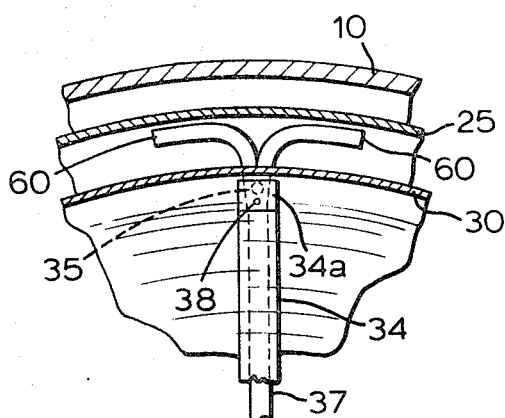
FIG. 3 is a partial section taken on the line 3—3 of FIG. 1, showing a detail of a pick-up device of the coupling in the reservoir compartment.
Figure 2:
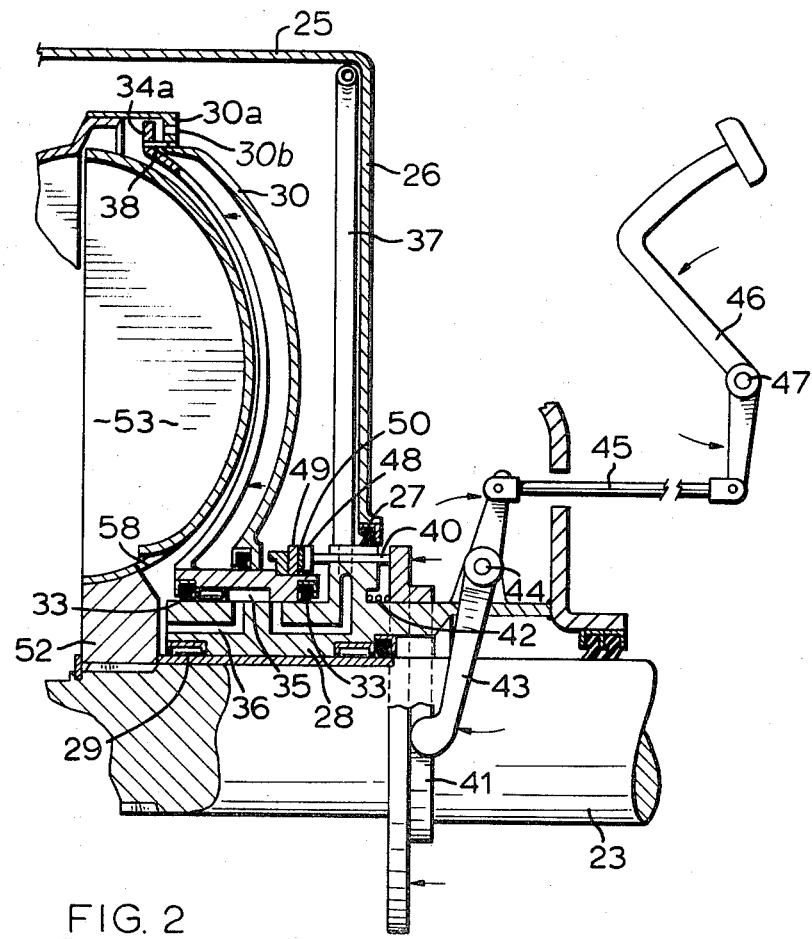
FIG. 2 is a similar cross section through a part of the embodiment of FIG. 1 and showing the said first valve means thereof in open position and the second valve means thereof in closed position.

The hydraulic coupling illustrated diagrammatically herein in FIGS. 1 to 3, is intended particularly for use in connection with an internal combustion engine as the power source for an automotive vehicle, the coupling comprising a variable clutch interposed between the engine and the power input shaft of a change speed gear.

The coupling comprises a sturdy outer casing 10 which is fastened, for example by bolts (not shown) to the outer casing (not shown) of the engine. A power output member of the engine, comprising for example the flywheel 11 thereof mounted on the engine crankshaft 12, is fastened to circumferentially spaced hubs such as 13, as by bolts 14, the hubs being in turn fastened to a first annular pump stall reservoir formed by walls 15 to 18. The walls 16 to 18 also form the pump element casing containing a plurality of radially-extending vanes 19. The pump element is connected to an annular hub 20 which is mounted by roller bearings 21 and a thrust bearing 22 on the adjacent end of an output shaft 23 carrying the turbine element. An end cap 24 is provided fastened to the hub 20.

A second annular pump storage reservoir is formed by an extension of the wall 15, an axial wall 25 and a radial wall 26, the last-mentioned wall terminating at a rotating seal 27 engaging an annular hub 28, which is rigidly connected to the casing 10 and is mounted by roller bearings 29 on the shaft 23. A generally dish-shaped valve member 30 is mounted on an axial extension of the wall 16 and terminates at its radially inmost end at a rotating seal 31 engaging an annular hub 32 mounted around the hub 28 and movable both axially and circumferentially thereon. Rotating seals 33 are provided at each end of the hub 32 between it and the hub 28. The hub 32 and another dished spoked member 34 rigidly fastened thereto and movable axially therewith constitute a common valve operating member of a first valve means formed by the dished members 30 and 34, and a second valve means formed by the hubs 28 and 32.

The radially-outermost part 34a of each spoke of the member 34 is shaped to conform accurately with the corresponding annular part 30a of the member 30, the latter being provided with a plurality of circumferentially equally-spaced valve apertures 30b that are closed by the part 34a when it is in the axial position shown in FIG. 1. With the hub 32 in the axial position shown in FIG. 1 a passageway 35 therein connnects two passageways 36 in the hub 28 to open the second valve means and permit liquid from the said second reservoir to pass via a scoop tube 37 back into the working chamber. Guide pins such as 38 attached to the spoke part 34a slide in apertures in the part 30a to maintain the parts in alignment.

The required axial movement of the common valve member takes place against the urge of the liquid in the working chamber, and against the urge of a spring 39, by means of a plurality of circumferentially spaced push rods such as 40, the rods being movable by a collar 41 mounted on the boss 28. The collar is moved in turn against the urge of a return spring 42, by means of a yoke 43, pivotally mounted to the casing 10 at 44, and connected by a rod 45 to an operator foot pedal 46 pivoted at 47 to the vehicle. The push rods 40 carry a ring 48 which engages a co-operating ring 49 on the hub 32 via a plurality of rollers 50.

The turbine element is constituted by an annular dished member 51 mounted by a hub 52 on the shaft 23 and rotatable therewith, and provided with radially extending vanes 53. A vent tube or pipe 54 extends from the hub 20 to a predetermined point in the working chamber discussed below, the radially inner end of the pipe communicating with the ambient atmosphere via a radially outwardly extending passage 55 containing a centrifugally openable ball-valve 55a. The pump element includes a plurality of radially inwardly located openings 56 for feeding liquid from the working chamber to the first reservoir, and a plurality of radially outwardly located openings 57 for returning liquid from the first reservoir to the working circuit. Openings 58 are provided in the wall 51 of the turbine element for a purpose described below.

In operation, with the output shaft 23 rotating at a speed to provide the usual 1–2 percent slip between the pump and turbine elements, the vortices formed in the working chamber assume the cross-section indicated by the broken line 59 in FIG. 1. As shown in FIG. 1, the first valve means is closed, so that as much as possible of the working fluid is retained in the working chamber and the coupling is operating at maximum torque and power transmission capacity. Any liquid which leaks from the working chamber into the second storage reservoir is immediately returned thereto by the scoop tube 37 via the open second valve means. It will be seen from FIG. 3 that the scoop tube is provided with oppositely directed inlets 60, so that it is operative in both directions of rotation of the device.

The radially outermost end of the vent tube or pipe 54 is located at the centre of the normal vortices in the working chamber, i.e., at the place where the movement or circulation of liquid is effectively nil, so that there is little or no tendency for the flow of liquid past the opening to create suction that can cause air to be sucked through the pipe into the working chamber; the entry of air into such a circuit results in a lowered efficiency of operation and is therefore to be avoided. As long as the pump is rotating at normal minimum speed, i.e., the idling speed or higher of the engine, the valve 55a is open and the pipe 54 and passage 55 are open to vent to the ambient atmosphere any gases generated during stall operation of the coupling. When the pump is rotating at less than the said minimum speed, and particularly when it is stopped, the valve 55a is closed and prevents escape of working fluid from the coupling. Since the design of the coupling does not necessitate taking account of internal pressure build-up, which is particularly likely under stall conditions, the whole construction can be much lighter than has been possible hitherto. In the event that it is the pump element that will be stalled while the turbine element continues to rotate then the latter will be provided with the vent tube, or both elements will be so provided.

Upon the operator depressing the pedal 46 the hub 32 moves to open the first valve apertures 30b, and working liquid escapes by centrifugal force from the working chamber into the storage reservoir. At the same time the second valve means receiving liquid from the scoop tube is closed to reduce the amount of liquid that the scoop tube can return to the working circuit. The quantity of working liquid in the working chamber is thereby reduced, reducing the torque and power transmission capacity of the coupling. The opening of the first valve means and the closing of the second valve means with movement of the pedal 46, and consequent movement of the hub 32, are correlated or programmed to obtain any desired torque and power transmission characteristic for the coupling.

In the event that the turbine element is stalled relative to the pump element, then the normal fluid vortices are disrupted progressively as the slip increases until the working liquid flows over the whole interior surfaces of the element walls 18 and 51. The orifices 56 will begin to feed working liquid into the first stall reservoir chamber, reducing the quantity in the working circuit. The location of these orifices 56 relative to the normal vortices determines the maximum temporary torque overload that the coupling will transmit. Liquid will also escape from the reservoir back into the working circuit via the openings 57, and eventually a stable state is reached with the reservoir filled, and in this condition the quantity of liquid remaining in the working circuit is just sufficient for the coupling to transmit enough torque that the driving engine will not be stalled, but can continue operation at its maximum torque speed. When the stall condition is removed the reservoir empties automatically and normal operating conditions are restored. The flow capacities of the apertures 56 and 57 are made such that during the stall condition resulting in the filling of the reservoir the rates of flow respectively into and out of the reservoir are such that the reservoir remains filled so that the coupling will transmit maximum torque, and the engine will continue to operate at maximum torque speed, when the turbine is stalled.

At stall the liquid in the space between the element wall 51 and the member 30 moves toward the hub, where it can enter the passage 36 and escape to the reservoir through scoop tube 37; in that event it would not be possible to control the amount of liquid remaining in the working chamber under the stall conditions. The openings 58 allow the liquid to spill back into the working chamber to prevent this. For further details of the operation of the stall reservoir etc. reference may also be made to my Canadian Pat. Ser. No. 896,311.

FIG. 4 shows the application of the invention to a hydraulic coupling torque converter. The stationary vane portions 61 of the converter section are in this embodiment mounted on a dish-shaped member 62 rigid with the hub 28, while a seal 63 is provided between the hubs 28 and 52. Each of the vanes 19, 53 and 61 is provided with respective annular sections 19a, 53a and 61a which together form a core guide ring assisting in establishing and maintaining the power transmitting vortices. The operation of the device will correspond to that of the coupling of FIGS. 1 to 3, and no further description is necessary in that respect. In this particular embodiment a stationary reaction member is shown, but the application of the invention to a converter, in which the reaction member alternatively is free or is locked, will be apparent to those skilled in the art.

For example, the device may be used as a converter in order to start a heavy load and is operated as a coupling once the load has reached normal operating speed. In such an arrangement the reaction member may be connected to a stationary part of the casing by an overrunning clutch. During start up of the load the internal speed and torque conditions are such that the reaction member is locked by the clutch and remains stationary for operation in the converter mode. When the load reaches operating speed the reaction member is free to rotate and the device operates in the coupling mode, the inefficiency due to the presence of the converter vanes, etc. being accepted.

Such a torque converter may operate unpressurised, but it is common practice to operate them with the working fluid pressurised by a separate pump, since this assists in the maintenance of the power-transmitting vortices in the presence of the reaction member. In this embodiment such pressurisation is illustrated as provided by a gear pump 64 driven for example from the engine and feeding working fluid to the converter interior from its outlet via pipes 65, a rotating coupling 66, a bore 67 in the shaft 23, and a controllable valve 68.

The inlet to the pump 64 is connected to the converter interior via pipes 69, a bore 70 and a pressure adjusting valve or calibrated orifice 71. The valve 68 is connected to the footpedal 46 and is moved thereby to the closed position as the first valve is opened and the second valve is closed, so that the pump 64 does not attempt to pressurise an emptying working chamber. A one way valve 72 is provided each of a plurality of bores 73 connecting the passage 36 to the working chamber interior to prevent liquid being forced into the scoop tube 37 from the pressurising circuit when the working chamber is full and the reservoir is empty.

I claim:

1. A hydraulic coupling comprising radially vaned pump and turbine elements together defining a toroidal working chamber, a reservoir chamber rotatable with the pump element, flow passages at a radially outer part of the working chamber to permit when open flow of working liquid from the working chamber to the reservoir chamber, first valve means comprising an annular valve member movable with the pump member and mounted for axial movement relative to the pump member to open and close the said flow passages, and pick-up means operative between the reservoir chamber and the working chamber to return liquid to the working chamber, the pick-up means including second valve means operable with operation of the first valve means to at least reduce such return of working liquid to the working chamber and thereby reduce the torque and power transmission capacity of the coupling.

2. The invention as claimed in claim 1, wherein the said first valve means comprise two dished members mounted for movement axially relative to one another and having radially outer portions conforming closely with one another, one of the said members having valve apertures in its said conforming portion that are closed by the abutting engagement of the two members with one another.

3. The invention as claimed in claim 1, wherein the said first valve means comprise a first dished member fixed to and rotatable with the pump element and surrounding the turbine element, a second dished member mounted between the first dished member and the turbine element for axial movement toward and away from the first dished member, the two dished members having radially outer portions conforming closely to one another, and the first member having valve apertures in its said conforming portion that are closed by the abutting engagement of the said conforming portions of the two members with one another.

4. The invention as claimed in claim 3, wherein the said second dished member is spoked with each of the spokes thereof closing and opening a respective valve aperture in the first dished member.

5. The invention as claimed in claim 1, wherein said second valve means comprise a first hub mounted on the coupling output shaft, the first hub carrying the said pick-up means comprising a scoop tube protruding into the said reservoir chamber, a second hub mounted on said first hub, and at least one passage passing through both said first and second hubs and opened and closed by relative axial movement between the hubs.

6. The invention as claimed in claim 5, wherein the said first valve means comprise two dished members, one of which is mounted by the said second hub for axial movement relative to the other, the members having radially outer portions conforming closely with one another, and one of the said members having valve apertures in its said conforming portion that are closed by the abutting engagement of the conforming portions of the two members with one another.

7. The invention as claimed in claim 3, wherein said second valve means comprise a first hub mounted on the coupling output shaft, the first hub carrying the said pick-up means comprising a scoop tube protruding into the said reservoir chamber, a second hub mounted on said first hub and carrying the said second dished member, and at least one passage passing through both said first and second hubs and opened and closed by relative axial movement between the hubs.

8. The invention as claimed in claim 1, and comprising a stall reservoir rotatable with the said pump element, radially-inwardly located openings from the working chamber discharging into the stall reservoir and disposed to feed working liquid into the stall reservoir upon the existence of a stall condition of the turbine element, and radially outwardly disposed openings from the stall reservoir into the working chamber, the flow capacity of the radially inward openings being greater than that of the radially-outward openings, and the capacity of the stall reservoir being such as to leave enough working liquid in the working chamber to transmit a torque which will permit the engine to operate at its maximum torque speed.

9. The invention as claimed in claim 8, wherein the location of the said radially inward openings is such that during the establishment of a stall condition of the turbine element the coupling will transmit temporarily more than the usual torque overload before settling to a steady overload value.

10. The invention as claimed in claim 1, wherein the coupling comprises a torque converter including a reaction member in the working chamber.

11. The invention as claimed in claim 10, and including pump means, a controllable valve, duct means connecting the said pump means to the interior of the coupling for pressurisation thereof through the said controllable valve, and means connecting said first and second valve means and said controllable valve to close the controllable valve and thereby suspend the said pressurisation by the pump while the first valve means is open.

12. The invention as claimed in claim 1, wherein the coupling includes a radially-outwardly extending vent passage carried by one of the elements and having an inlet disposed in the location in the working chamber of minimum liquid circulation for normal liquid vortices established therein, and having an outlet closer to the coupling axis than the said inlet, and a centrifugally operable valve in the vent passage opening upon rotation of the element at more than a predetermined minimum speed.

13. The invention as claimed in claim 12, wherein the said vent passage is provided by a radially-outwardly extending tube extending from a hub of the respective element, and a radially outwardly extending bore in the same hub extending from the radially inmost end of the said tube and including the said valve.

14. A hydraulic coupling comprising radially vaned pump and turbine elements rotatable about a common axis and together defining a toroidal working chamber, a radially outwardly extending vent passage carried by one of the elements and having an inlet disposed in the location in the working chamber of minimum liquid circulation for normal liquid vortices established therein, and having an outlet closer to the coupling axis than the said inlet, and a centrifugally operable valve in the vent passage opening upon rotation of the element at more than a predetermined minimum speed.

15. The invention as claimed in claim 14, wherein the said vent passage is provided by a radially-outwardly extending tube extending from a hub of the respective element, and a radially outwardly extending bore in the said hub extending from the radially inmost end of the said tube and including the said valve.

* * * * *